(12) United States Patent
Fan et al.

(10) Patent No.: US 8,843,105 B2
(45) Date of Patent: Sep. 23, 2014

(54) CENTRALIZED RESCUE NETWORK

(71) Applicant: AT&T Intellectual Property I, LP, Atlanta, GA (US)

(72) Inventors: James W. Fan, San Ramon, CA (US); Jeffrey A. Aaron, Atlanta, GA (US); Jennifer K. Lam, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/693,245

(22) Filed: Dec. 4, 2012

(65) Prior Publication Data

US 2014/0155018 A1     Jun. 5, 2014

(51) Int. Cl.
*H04M 11/00* (2006.01)
*H04W 72/04* (2009.01)

(52) U.S. Cl.
CPC .................................. *H04W 72/048* (2013.01)
USPC ..................... 455/404.1; 455/404.2; 455/407; 455/414.2; 455/445

(58) Field of Classification Search
USPC .................................. 455/404.1, 404.2, 445
See application file for complete search history.

(56) References Cited

U.S. PATENT DOCUMENTS 7,221,928 B2 *    5/2007   Laird et al. ................. 455/404.1

\* cited by examiner

*Primary Examiner* — Charles Appiah
*Assistant Examiner* — Randy Peaches
(74) *Attorney, Agent, or Firm* — Baker & Hostetler LLP

(57) ABSTRACT

A centralized rescue network system can receive an emergency alert message from a mobile device and use data from the message and from other sources to determine an appropriate response resource allocation. The centralized rescue network system may also request and receive additional data from the sending mobile device, other mobile devices, and/or other systems. A response message may be sent to the sending mobile device, other devices and/or systems. The centralized rescue network system can send requests to emergency services providers based on its analysis and processing of the emergency alert message and any other data so that the most efficient use is made of emergency resources.

18 Claims, 8 Drawing Sheets

CENTRALIZED RESCUE NETWORK

TECHNICAL FIELD

The technical field generally relates to wireless communications and specifically relates to centralized coordination of emergency response resources in a wireless communications system.

BACKGROUND

Current wireless communications technologies have been a great benefit to those who find themselves in an emergency situation. For example, where once someone in an emergency situation had to get to a landline telephone to alert authorities or others about the emergency, wireless mobile telephones offer users a quick and easy way to contact emergency response agencies (police, fire department, ambulance, etc.) or anyone else when and where the user encounter an emergency. Emergency response personnel are typically contacted through a voice call to an emergency number, such as "911" in the United States. More recently, alternative communications may be used to contact emergency personnel, such as email and text messages, and some devices are now equipped to automatically generate and send emergency communications at the press of a button or detection of some other input or condition. However, current wireless mobile devices and their associated networks merely provide a communications means to facilitate communications between someone involved in or witness to an emergency and those who respond to emergencies. In the current state of the art, wireless communications networks and devices are not actively involved in assisting emergency responders or improving the allocation of emergency response resources.

SUMMARY

A centralized rescue network system may receive an emergency alert message from a mobile device and use data from the message and from other sources to determine an appropriate response resource allocation. The centralized rescue network system may also request and receive additional data from the sending mobile device, other mobile devices, and/or other systems. Such additional data may include images, audio, video, sensor data, location data, and any other data that may be used to determine appropriate emergency resource allocation. A response message may be sent to the sending mobile device, other devices and/or systems. The centralized rescue network system may send requests to emergency services providers based on its analysis and processing of the emergency alert message and any other data so that the most efficient use is made of emergency resources. The centralized rescue network system may send additional requests and information to emergency services providers as additional information is received and processed at the centralized rescue network system. These and other aspects of the present disclosure are set forth in more detail below and in the figures.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
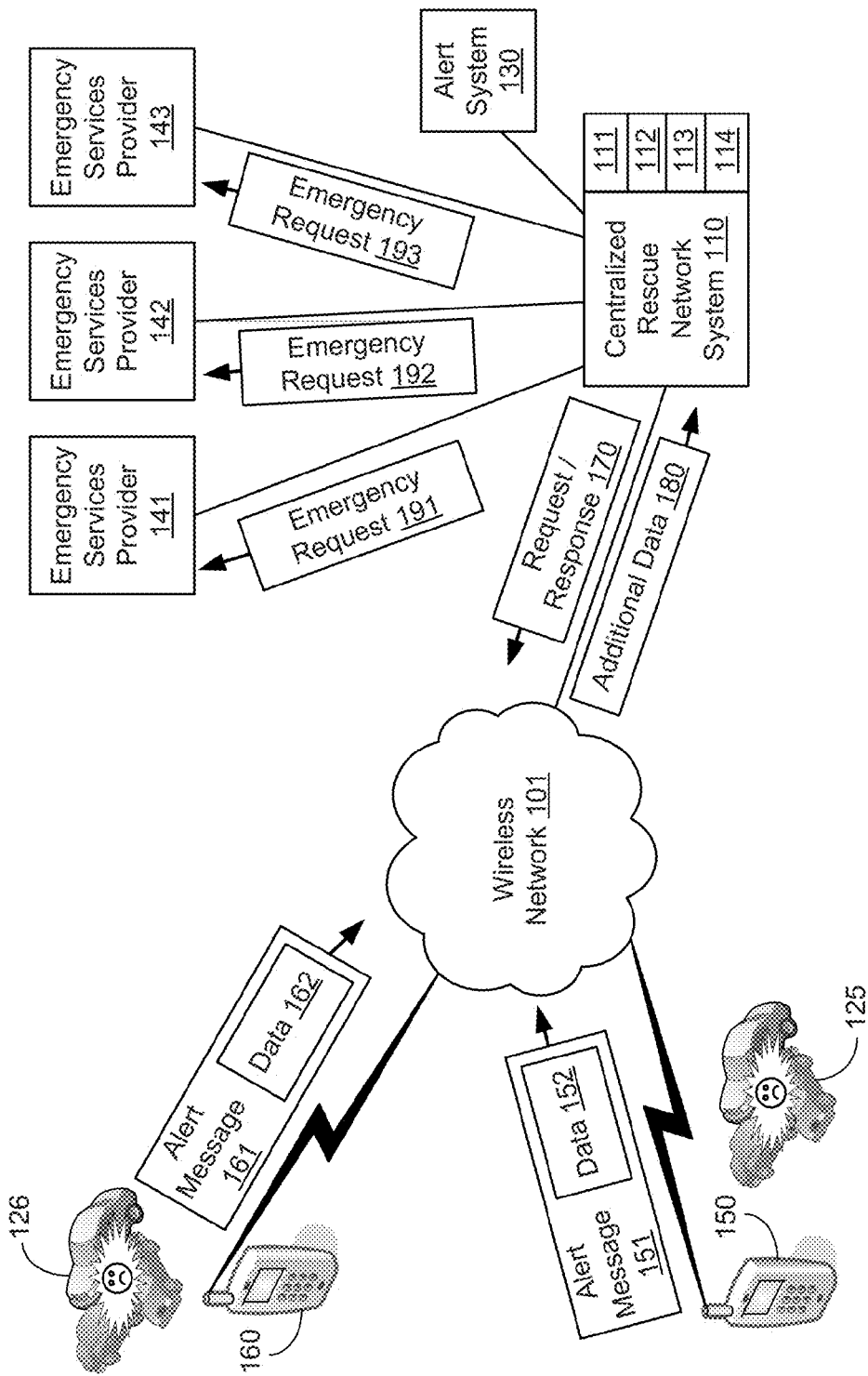
FIG. 1 illustrates a non-limiting exemplary system in which methods and systems for a centralized rescue network may be implemented.

FIG. 1 illustrates an exemplary system that may be used to implement methods and systems for a centralized rescue network. Mobile device 150, in an embodiment operated by a customer of a provider of network 101, may be in communication with network 101 using any wireless communications technology. Mobile device 150 may be any type of wireless communications device, including user equipment (UE), a wireless transmit and receive unit (WTRU) a mobile telephone, a wireless communications device, a smartphone, or any other communications device as disclosed herein, or any other type of device capable of being configured to perform the functions and features of the present disclosure. Mobile device 160 may also be any type of wireless communications device and may be configured to communicate with network 101. Network 101 may be any type of communications network, including a wireless network, a wired network, and a combination thereof, implementing any number and type of communications protocols and technologies. All such embodiments are contemplated as within the scope of the present disclosure.

An operator of mobile device 150 may be involved in, proximate to, or simply aware of incident 125. Incident 125 may be any incident or occurrence that may require emergency services or some sort of emergency response (e.g., car accident, fire, health emergency, criminal activity, etc.) Similarly, an operator of mobile device 160 may be involved in, proximate to, or simply aware of incident 126 that may also be any incident or occurrence that may require emergency services or some sort of emergency response. In some embodiments incidents 125 and 126 are the same incident, while in others they are separate and distinct incidents.

In response to becoming aware of incident 125, an operator of mobile device 150 may operate mobile device 150 to transmit alert message 151 to network 101. This may be accomplished using any means, including user activation of a control on mobile device 150 that generates and transmits alert message 151, user dialing of an emergency telephone number on mobile device 150 (e.g., 911), and user initiating a text message or other message. In another embodiment, mobile device 150 may automatically generate alert message 151 in response to the detection of certain conditions that may be caused by or represented by incident 125. For example, mobile device 150 may be equipped with heat, audio, wave, and/or motion sensors that detect major environmental changes and, in response, automatically generate and transmit alert message 151. In another example, mobile device 150 may be equipped with health-related measurement and/or detection hardware and/or software to detect a user of mobile device's 150 health condition changes. In another alternative, mobile device 150 may interface with other devices, for example using a short range wireless protocol (e.g., Bluetooth), such as implanted health devices and/or sensors, local surveillance cameras and/or software, local transportation vehicles (e.g., car, motorcycle, etc.), other user devices, etc. Mobile device 160 may similarly transmit alert message 161 in response to incident 126 or in response to user operation of mobile device 160 upon user awareness of incident 126. All such embodiments are contemplated as within the scope of the present disclosure.

In yet another embodiment, mobile device 150 may initiate and/or execute an application (e.g., mobile device "app"), which may be preinstalled on mobile device 150 or downloaded onto mobile device 150 before or after purchase of the device, and which may be updateable at any point in time, that generates and/or transmits alert message 151. Such an application may generate alert message 151 and directly transmit the message, or it may generate alert message 151 and cause mobile device 150 to transmit the message. Such an application may generate and/or transmit alert message 151 automatically without user intervention or at the request of a user, for example by activation of a control of the application. Mobile device 160 may similarly generate and/or transmit alert message 161 in response to incident 126. All such embodiments are contemplated as within the scope of the present disclosure.

Alert messages 151 and 161 may be any type and form of alert message, request for assistance, rescue request, or any other message indicating that assistance from at least one emergency services provider may be needed that may be transmitted from a mobile device to a network. Alert messages 151 and 161 may include data 152 and 162, respectively, each of which represents any type of data and any combination of types of data that may be included in an emergency alert message. For example, either or both of data 152 and 162 may include video, text, voice data, one or more images, audio data, computer instructions, location data, or any other type of data or any combination thereof. Either or both of alert messages 151 and 161 and/or data 152 and 162 may include information identifying mobile device 150 and 160, respectively, an operator or account associated with the respective mobile device, and/or any other identifier, address, location, type, model, capability, and/or any other characteristic or identifier that may be associated with a mobile device, an account associated with a mobile device, or a user of a mobile device.

Note also that each of alert messages 151 and 161 represents one or more messages, packets, or other communications. For example, alert message 151 may represent several voice data packets transmitted from mobile device 150. In an embodiment, alert messages 151 and/or 161 may represent several periodic alert messages. For example, a user of mobile device 150 may first place an emergency call (e.g., call to 911) and then capture and transmit images of incident 125 at later time. All such communications are represented by alert message 151, and any similar series of communications transmitted from mobile device 160 is represented by alert message 161.

Either or both of data 152 and 162 may be data that was automatically collected and/or generated by the transmitting mobile device, or data that was collected and/or generated by a user of the transmitting device. For example, data 152 may include health data automatically collected by mobile device 150 that is transmitted automatically to network 101 upon detection of an adverse health condition of a user of mobile device 150. In another example, data 162 may be a picture or video of incident 126 taken by a user of mobile device 160. Any means of acquiring and/or generating such data is contemplated as within the scope of the present disclosure.

Either or both of alert messages 151 and 161 may be addressed by the transmitting mobile device to centralized rescue network system 110. Alternatively, network 101 may determine that either or both of alert message 151 and 161 is an emergency message, and in response may relay or send a copy of the alert message to centralized rescue network system 110. Centralized rescue network system 110 may be any number and type of device or combination of devices that collects and processes any type of data relevant to providing emergency services. Centralized rescue network system 110 may also represent software executing on hardware that is either dedicated to performing emergency services functions or on hardware that may perform other functions as well. Centralized rescue network system 110 may be located within network 101, may be separate but communicatively connected to network 101, or may be distributed among several physically separate devices, each of which may or may not be within network 101. Any configuration and/or design of centralized rescue network system 110 are contemplated as within the scope of the present disclosure.

Centralized rescue network system 110 may include one or modules 111, 112, 113, and 114, each of which may be dedicated to a specific function. Each of modules 111, 112, 113, and 114 may be a separate physical device, a software module, or a combination thereof. Functions that may be performed by one or more of modules 111, 112, 113, and 114 may include data storage, alert identification, policy enforcement, policy configuration, analytical functions, response prioritization, response determination, response timeline management, error handling, data logging and/or recording, communications, learning, device specific policy, device input and/or trigger input and identification, alert generation, timeline response, device communications, device security, device error handling, and any other function that may be performed by or at the direction of a centralized rescue network system as described herein.

Centralized rescue network system 110 may receive one or both of alert messages 151 and 161 and process the message(s) to determine appropriate emergency response resource assignment. For example, centralized rescue network system 110 may use data 152 to determine the type of emergency represented by incident 125 and appropriate emergency response resource assignment. Centralized rescue network system 110 may also use other data, for example data stored by one or more of modules 111-114, to determine appropriate emergency response resource assignment. For example, module 111 may store historical emergency incident data for one or more locations. Upon receiving alert message 151, centralized rescue network system 110 may determine that incident 125 is taking place at or proximate to a particular location. Centralized rescue network system 110 may then obtain historical emergency incident data for that particular location from module 111. Based on data 152, alert message 151, and historical emergency incident data for the particular location, centralized rescue network system 110 may determine that incident 125 is likely to require more resources than an incident of a similar type. For example, where incident 125 represents a car accident, centralized rescue network system 110 may determine that accidents at the location of incident 125 typically require at least two ambulances (e.g., the location of incident 125 is a high way interchange and accidents there occur at high speeds, therefor resulting in greater injuries.) Centralized rescue network system 110 may then notify emergency services provider 141 via emergency request 191 that two or more ambulances may be needed at the location of incident 125.

Centralized rescue network system 110 may also use data collected from other sources. For example, centralized rescue network system 110 may communicate with alert system 130 that may contain information related to any type of emergencies, incidents, historical data, etc. For example, alert system 130 may be a child abduction system (e.g., AMBER alert system). Centralized rescue network system 110 may query alert system 130 to determine whether a reported incident may be related to a known incident for which data may be stored in alert system 130.

Upon determining the appropriate resources needed for the reported incident, centralized rescue network system 110 may transmit one or emergency requests to one or more emergency services providers. Each of emergency services providers 141, 142, and 143 may be any emergency services providers, including police, ambulance services, fire departments, local, state, or federal governmental agencies, etc. Centralized rescue network system 110 may transmit one or more of emergency requests 191, 192, and 193. Each of emergency requests 191, 192, and 193 may be a particularized request specifically intended for the destination emergency services provider. Alternatively, centralized rescue network system 110 may transmit a same emergency request to two or more emergency services providers. Each of emergency requests 191, 192, and 193 may include any information that may be required by or helpful to an emergency services provider.

Centralized rescue network system 110 may request additional information from one or more devices as part of its processing of an alert message. For example, centralized rescue network system 110 may transmit request/response 170 to mobile device 150 upon receiving and processing alert message 151. Request/response 170 may include a request for an image of incident 125, which may then be obtained by a user of mobile device 150 and transmitted from mobile device 150 as additional data 180. In an embodiment, additional data may be automatically generated and provided by a mobile device. For example, centralized rescue network system 110 may transmit request/response 170 to mobile device 150 requesting location data for mobile device 150. Mobile device 150 may, in response, automatically determine its own location data and provide that data as additional data 180. Alternatively, any additional sensor data, image data, audio data, etc., may be requested from a mobile device and the mobile device may provide this data automatically. This may performed transparently to a user of mobile device 150, or may be done with an approval or notification of a user of mobile device 150. In an embodiment, a mobile device may be configured with an application or apparatus that allows it to be remotely controlled by a centralized rescue network system. Any request for any type of data is represented by request/response 170, and any type of response data is represented by additional data 180.

Centralized rescue network system 110 may also, or instead, provide a response to a mobile device as part of its processing of an alert message. For example, centralized rescue network system 110 may transmit request/response 170 to mobile device 150 upon receiving and processing alert message 151. Request/response 170 may include an acknowledgement that alert message 151 was received, additional instructions for responding to incident 125, additional emergency contact information such as a local authorities' telephone number, or any other information or data that may be sent in response to an alert message. Any type of response including any information is represented by request/response 170.

Figure 2:
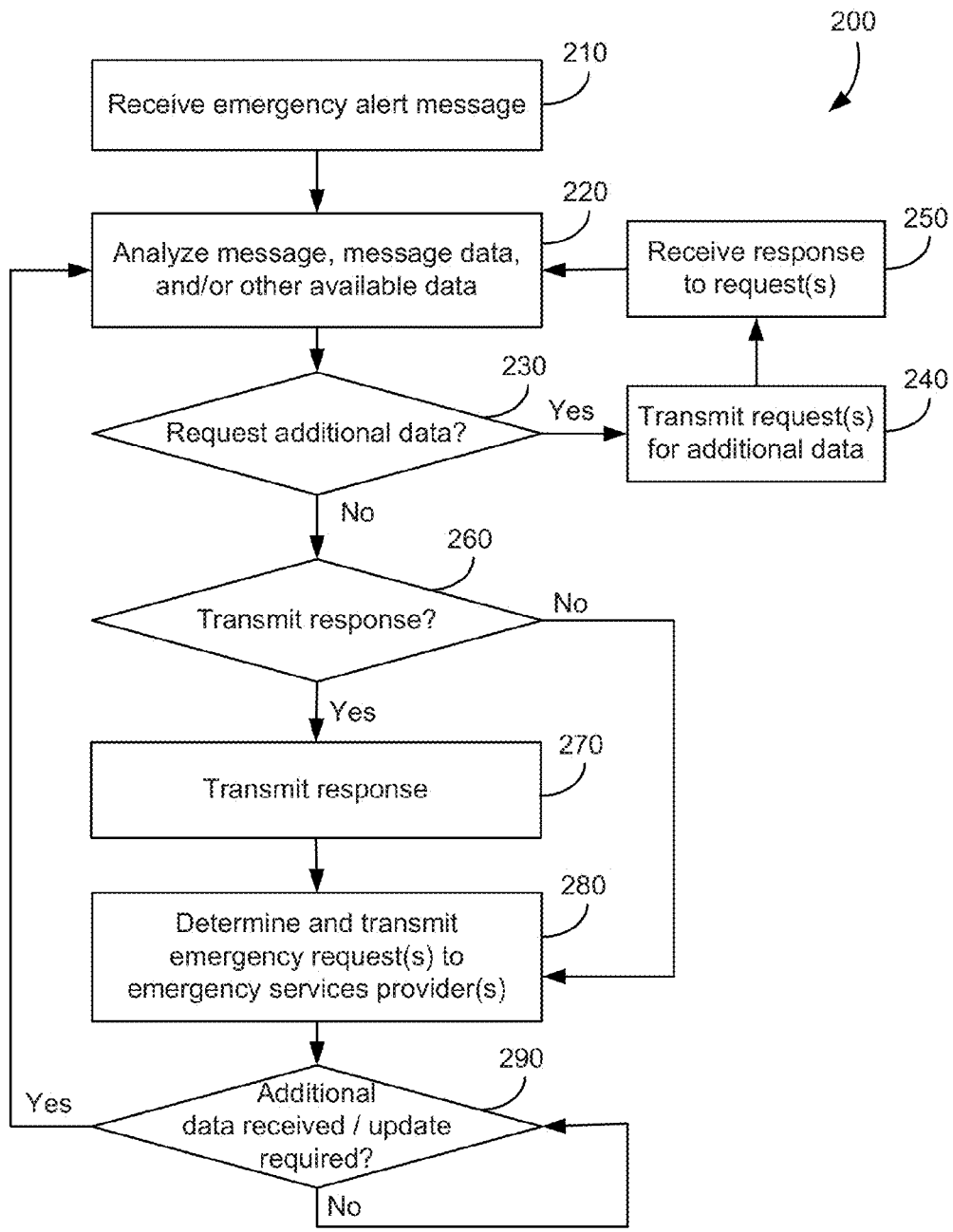
FIG. 2 illustrates a non-limiting exemplary method of implementing a centralized rescue network.

FIG. 2 illustrates exemplary, non-limiting method 200 of implementing an embodiment as disclosed herein. Method 200, and the individual actions and functions described in method 200, may be performed by any one or more devices, including those described herein, such as the system illustrated in FIG. 1. In an embodiment, method 200 may be performed by a system such as centralized rescue network system 110, by any other network component or combination of components, or by any other device or component or combination thereof, in some embodiments in conjunction with other network elements, and/or software configured and/or executing on any network or network attached element. Note that any of the functions and/or actions described in regard to any of the blocks of method 200 may be performed in any order, in isolation, with a subset of other functions and/or actions described in regard to any of the other blocks of method 200 or any other method described herein, and in combination with other functions and/or actions, including those described herein and those not set forth herein. All such embodiments are contemplated as within the scope of the present disclosure.

At block 210, one or more emergency alert messages may be received at a centralized rescue network system. The one or more alert messages received at block 210 may be any message or messages, packets, or other communications received from a mobile device. The emergency alert message may be any type and form of alert message, request for assistance, rescue request, or any other message indicating that assistance from at least one emergency services provider may be needed. The emergency alert message may include data of any type and any combination of types, including video, text, voice data, one or more images, audio data, computer instructions, location data, or any other type of data or any combination thereof.

At block 220, the emergency alert message may be analyzed using data included with the emergency alert message and/or data stored at and/or obtained by at a centralized rescue network system. Data used to perform this analysis may be any data set forth herein, including in the examples below, and any other data that may be used to determine appropriate emergency resource allocation.

At block 230, a determination may be made as to whether additional information or data should be requested. If so, one or more requests for additional data may be sent to the mobile device that initiated the emergency alert message received at block 210, to another mobile device, to another system (e.g., AMBER Alert system), or to any combination thereof at block 240. At block 250, one or more responses to the request(s) for additional data may be received. Further analysis may be performed at block 220, and any additional requests for data may be addressed at block 230, 240, and 250 as needed.

At block 260, a determination may be made as to whether a response is to be transmitted to the mobile device that initiated the emergency alert message received at block 210 or to any other device or system. If so, at block 270 a response may be transmitted. Such a response may include an acknowledgement that the emergency alert message was received, instructions for actions that may be taken by the sender of the emergency alert message, directions to safety, estimated response time for emergency services personnel, and/or any other information or data that may be provided to a user who initiated an emergency alert message and/or to any other system or device.

At block 280, a determination of appropriate emergency services resources may be made and one or more requests may be made to the corresponding emergency services providers. This determination may be based on the analysis performed at block 220 and/or any other analysis, data, and/or information available. One or more emergency requests may be generated and transmitted to one or more emergency services providers, which may include police, ambulance services, fire departments, local, state, or federal governmental agencies, etc. Each emergency request transmitted may be a particularized request specifically intended for the destination emergency services provider. Alternatively, a same emergency request may be transmitted to two or more emergency services providers. Each emergency request may include any information that may be required by or helpful to an emergency services provider.

At block 290, a determination may be made as to whether additional data has been received or whether a further update is required. For example, another emergency alert message from the same mobile device that originated the emergency alert message at block 210 may be received with additional information. Alternatively, additional information may be received from a third party or another system. In another embodiment, a centralized rescue network system may be configured to periodically update its analysis of a particular incident. For example, where a fire is reported, additional requests for information from users at the scene of the fire may be requested every few minutes. Alternatively, where an estimated arrival time of emergency personnel was generated, a follow up message may be sent to users at the scene of an incident at the estimated time to determine whether the emergency personnel has arrived. Any other triggers, new data, timeframes, or other criteria may be used at block 290 to determine whether additional information is received or to be generated.

Set forth below are several examples of how a centralized rescue network system may be used to improve the efficiency of resources allocation in emergency and rescue situations. Any of these examples may be implemented using any portion or the entirety of the systems and methods disclosed herein, in isolation or in conjunction with other systems and methods. These examples are non-limiting embodiments and not to be construed as limiting the application of the disclosed embodiments in any way. One skilled in the art will readily recognize that the disclosed systems and methods may be applied to numerous other situations, all of which are contemplated as within the scope of the present disclosure.

In one embodiment, historical user data may be used to determine the type and number of resources to allocate to a reported incident. For example, a centralized rescue network system may receive an emergency alert message from a user or a mobile device that is identified as a reliable, frequent reporter of incidents (e.g., a mobile device associated with a first responder, emergency services provider employee, etc.) In response, a centralized rescue network system may indicate to emergency services providers that the incident is legitimate and/or from a legitimate source. Alternatively, a centralized rescue network system may receive an emergency alert message from a user or a mobile device that is identified as a frequent false reporter of incidents (e.g., frequent prank calls or false reports of emergencies.) In response, a centralized rescue network system may indicate to emergency services providers that the incident is less likely to be legitimate and/or has been reported by a frequent source of unreliable emergency reports.

In another embodiment, data associated with other incidents may be used to determine emergency resource allocation. A centralized rescue network system may have data indicating that several incidents have occurred, and that resources for responding to such incidents may be more scarce than normal. The centralized rescue network system may request resources accordingly. For example, a centralized rescue network system may be aware of an ongoing first fire when a report of a second fire is received. Rather than requesting typical fire response resources (e.g., three fire trucks), the centralized rescue network system may request fewer resources (e.g., one fire truck) so that all local fire response resources are not exhausted. In such an embodiment, or in any other embodiment, a centralized rescue network system may have data indicating the resources that are available and may use that data in conjunction with data about ongoing incidents to determine an appropriate number and type of resources to request for a particular incident.

Updated information may be used in some embodiments to adjust response resources as an incident is in progress. For example, a first fire may have three fire trucks on the way to fight the fire, but additional data may be received that the fire is small and relatively under control. The centralized rescue network system may alert the fire department that not as many resources are required as initially determined, and therefore one or two of the fire trucks can be recalled. Similarly, while one fire is being addressed by three fire trucks, a second fire may be reported that is larger and of greater intensity. This information may be used by a centralized rescue network system to request that one or two of the truck at the first fire be reallocated to the second, larger fire. In an embodiment, an incident may not be addressable, or may be too dangerous to address, while other more easily addressable incidents are occurring. In such an embodiment, an abandonment of the unaddressable incident may be recommended by a centralized rescue network system so that the resources available may be put to their best use addressing the remaining incidents. Data may be stored indicating how such a determination was made, for this embodiment and for any other disclosed herein, so that additional review may be performed at a later time. Note that this type of analysis may be applied to any situation in real time to improve resource allocation, such as criminal activities, car accidents, health incidents, etc.

Instructions and request for additional data may be sent to users of mobile devices based on the ongoing incident. For example, it may be common for several users to report an incident when it occurs (e.g., witnesses to a car accident.) A centralized rescue network system may determine that one of these users is most proximate to the incident and request that that user capture an image of the accident. Alternatively, a centralized rescue network system may determine that one of these users is at a location that provides a better angle of view of the incident and request that that user capture an image of the accident. In an embodiment, a centralized rescue network system may determine that an incident involves a high risk for bystanders (e.g., accident involving a truck carrying dangerous chemicals) and may in response transmit a message to any users that reported the incident to move away from the area. Such a message may also include specific directions to a safe location.

In another embodiment, a centralized rescue network system may receive several emergency alert messages from several users and may determine, based on the location of the users, the type of emergency alert, and/or any other data, that the reported incidents are the same incident or related incidents. This information may be used to send a single request for resources to emergency services providers rather than several requests for a single incident.

In another embodiment, a centralized rescue network system may request alternate resources to those typically requested due to ongoing incidents. For example, where a heart attack victim is reported in an emergency alert message, an ambulance may be typically called. However, a centralized rescue network system may be aware that the available ambulances are engaged in other incidents and may in turn alert a fire department of the incident where the fire department is equipped to address a heart attack. Any other criteria and means for determining and requesting alternate resources may be used, and all such criteria and means are contemplated as within the scope of the present disclosure.

A centralized rescue network system may store, update, and analyze incident data on an ongoing basis in order to refine its response determination algorithm. For example, a first call from a prank caller may not be detected as such, but each subsequent call from that particular user's device may be noted and with each additional prank call, the centralized rescue network system may be more likely to notify emergency response personnel that a subsequent call is likely to be a prank call. In another example, a first call from a legitimate user about an incident may be determined to be of normal reliability, but after one or more subsequent legitimate calls from the user are noted, requests to emergency services personnel may indicate that the incident comes from a highly reliable source. These are simple examples used for descriptive purposes, but one skilled in the art will recognize that much more sophisticated means of improving a centralized rescue network system's response algorithm are possible and all such means are contemplated as within the scope of the present disclosure.

A centralized rescue network may use updateable policy rules, analytics, artificial intelligence, and other means to make its decisions and control its transmission of messages and request for data as it receives initial and subsequent messages and data. Templates may be used for particular types of incidents. For example, a message sent to emergency services providers may use a car accident template when the incident being reported is a car accident. Such a template may have particular fields that may not be appropriate for, e.g., a house fire, such as make and model of cars involved, number of passengers, etc. Such templates may be edited and/or added over time automatically, by operators of a centralized rescue network system, or both. Scripts may be used with such templates that may contain multiple conditional rules that may include branching aspects. Artificial intelligence or other types of automated learning may be used in a centralized rescue network system to determine the effectiveness of such templates and to record and adapt to problems or inefficiencies so that such templates may be automatically updated and improved over time.

The centralized rescue network systems and methods described above assist in providing improved emergency response and resource allocation by automatically requesting appropriate resources based on a greater body of available data than that available to response systems in the current state of the art. By implementing the present disclosure, lives may be saved, injuries minimized, and dangerous incidents may be better and more efficiently addressed. Set forth below are further exemplary systems, devices, and components in which aspects of the disclosed centralized rescue network systems and methods may be implemented.

Figure 3:
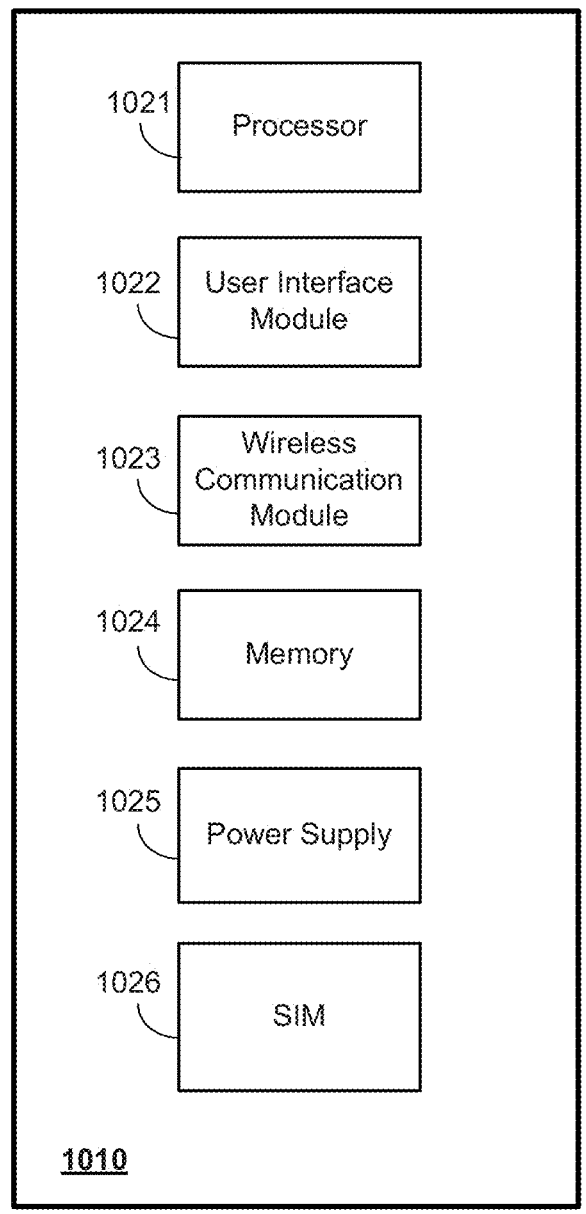
FIG. 3 is a block diagram of a non-limiting exemplary mobile device in which methods and systems for a centralized rescue network may be implemented.

FIG. 3 illustrates an example wireless device 1010 that may be used in connection with an embodiment. References will also be made to other figures of the present disclosure as appropriate. For example, mobile devices 150 and 160 may be wireless devices of the type described in regard to FIG. 3, and may have some, all, or none of the components and modules described in regard to FIG. 3. It will be appreciated that the components and modules of wireless device 1010 illustrated in FIG. 3 are illustrative, and that any number and type of components and/or modules may be present in wireless device 1010. In addition, the functions performed by any or all of the components and modules illustrated in FIG. 3 may be performed by any number of physical components. Thus, it is possible that in some embodiments the functionality of more than one component and/or module illustrated in FIG. 3 may be performed by any number or types of hardware and/or software.

Processor 1021 may be any type of circuitry that performs operations on behalf of wireless device 1010. In one embodiment, processor 1021 executes software (i.e., computer-readable instructions stored on a tangible computer-readable medium) that may include functionality related to centralized rescue network systems and methods, for example. User interface module 1022 may be any type or combination of hardware and/or software that enables a user to operate and interact with wireless device 1010, and, in one embodiment, to interact with a system or software enabling the user to place, request, and/or receive calls, text communications of any type, emergency alert messages, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 4:
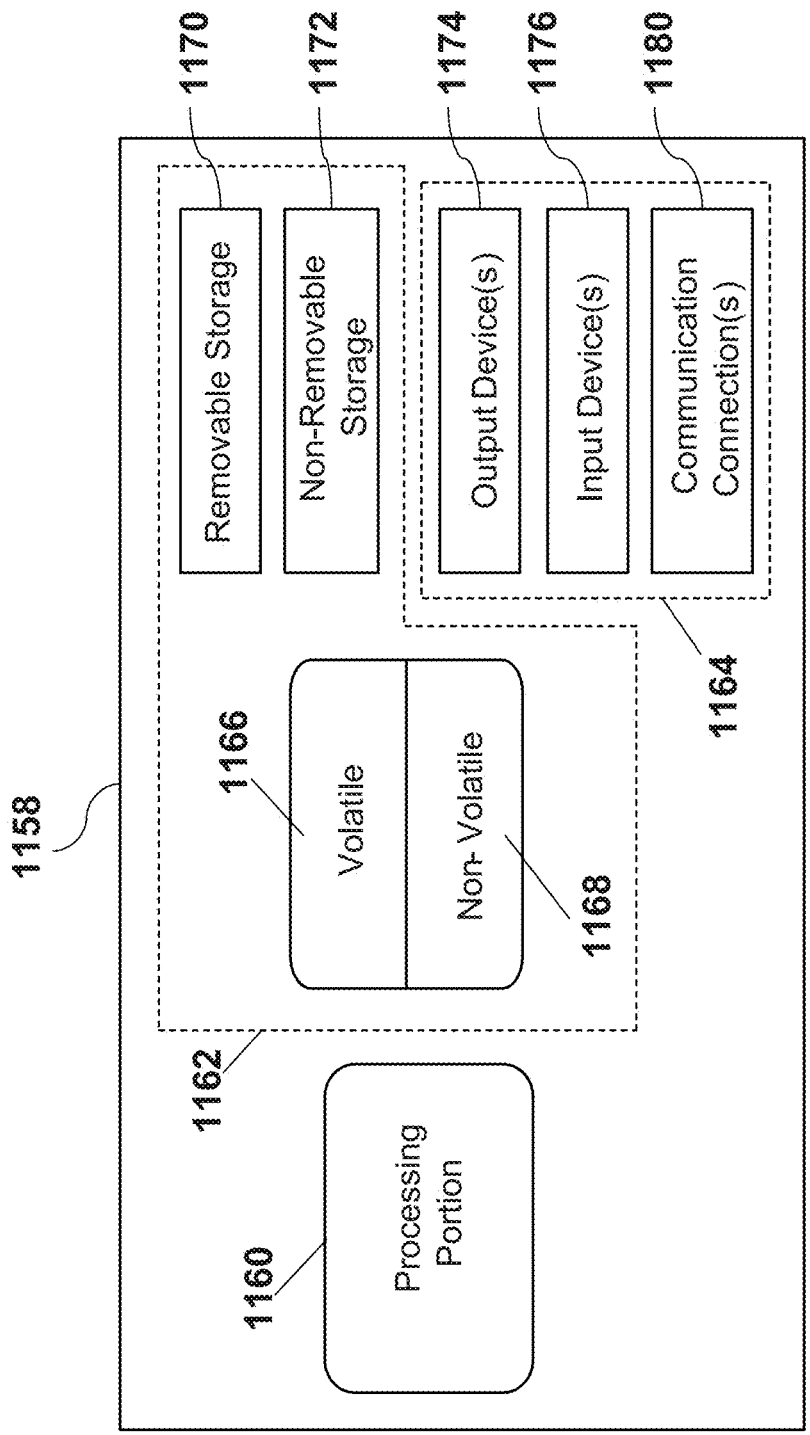
FIG. 4 is a block diagram of a non-limiting exemplary processor in which methods and systems for a centralized rescue network may be implemented.

FIG. 4 is a block diagram of an example processor 1158 which may be employed in any of the embodiments described herein, including as one or more components of mobile devices 150 and 160, as one or more components of centralized rescue network system 110, and/or any related equipment, and/or as one or more components of any third party system or subsystem that may implement any portion of the subject matter described herein. It is emphasized that the block diagram depicted in FIG. 4 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 4, the processor 1158 comprises a processing portion 1160, a memory portion 1162, and an input/output portion 1164. The processing portion 1160, memory portion 1162, and input/output portion 1164 are coupled together (coupling not shown in FIG. 4) to allow communications between these portions. The input/output portion 1164 is capable of providing and/or receiving components, commands, and/or instructions, utilized to, for example, transmit and/or receive configuration data, transmit and receive device condition data, transmit and receive emergency alert messages and related data, messages, and requests for data, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing condition and event data, emergency alert messages and related data, configuration commands, profiles, thresholds, APNs, MNCs, MCCs, service requests, radio resource requests, QoS and/or APN parameters, device and link status, condition, and congestion data, text and data communications, calls, voicemail, multimedia content, visual voicemail applications, etc. Depending upon the exact configuration and type of processor, the memory portion 1162 may be volatile (such as RAM) 1166, non-volatile (such as ROM, flash memory, etc.) 1168, or a combination thereof. The processor 1158 may have additional features/functionality. For example, the processor 1158 may include additional storage (removable storage 1170 and/or non-removable storage 1172) including, but not limited to, tangible computer-readable storage media such as magnetic disks, optical disks, tapes, flash memory, smart cards, and/or any combination thereof. Computer-readable storage media, such as memory and storage elements 1162, 1170, 1172, 1166, and 1168, may be tangible storage media that may be volatile or nonvolatile, removable or non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other tangible medium that may be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. may also be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however; and thus the below-described network architectures merely show how centralized rescue network systems and methods may be implemented with stationary and non-stationary network structures and architectures. It will be appreciated, however, that centralized rescue network systems and methods as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, centralized rescue network systems and methods may be implemented independently of the method of data transport and does not depend on any particular network architecture or underlying protocols.

Figure 5:
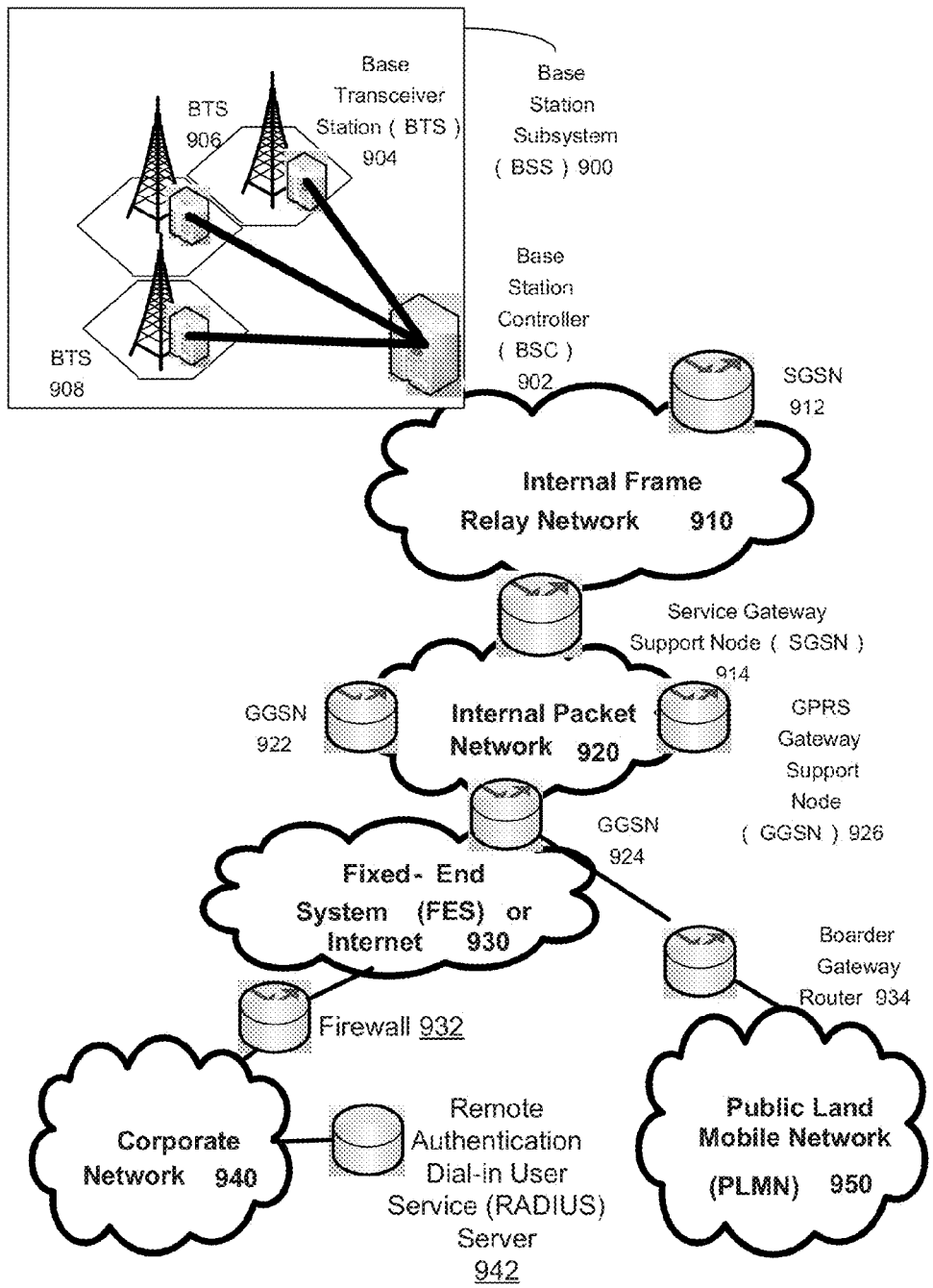
FIG. 5 is a block diagram of a non-limiting exemplary packet-based mobile cellular network environment, such as a GPRS network, in which methods and systems for a centralized rescue network may be implemented.

FIG. 5 depicts an overall block diagram of an exemplary packet-based mobile cellular network environment, such as a GPRS network, in which centralized rescue network systems and methods such as those described herein may be practiced. In an example configuration, any RAN component as described herein may be encompassed by or interact with the network environment depicted in FIG. 5. Similarly, mobile devices 150 and 160 may communicate or interact with a network environment such as that depicted in FIG. 5. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 150 and 160) become connected to the wireless network. In exemplary fashion, the packet traffic originating from user devices (e.g., mobile devices 150 and 160) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc., may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 6:
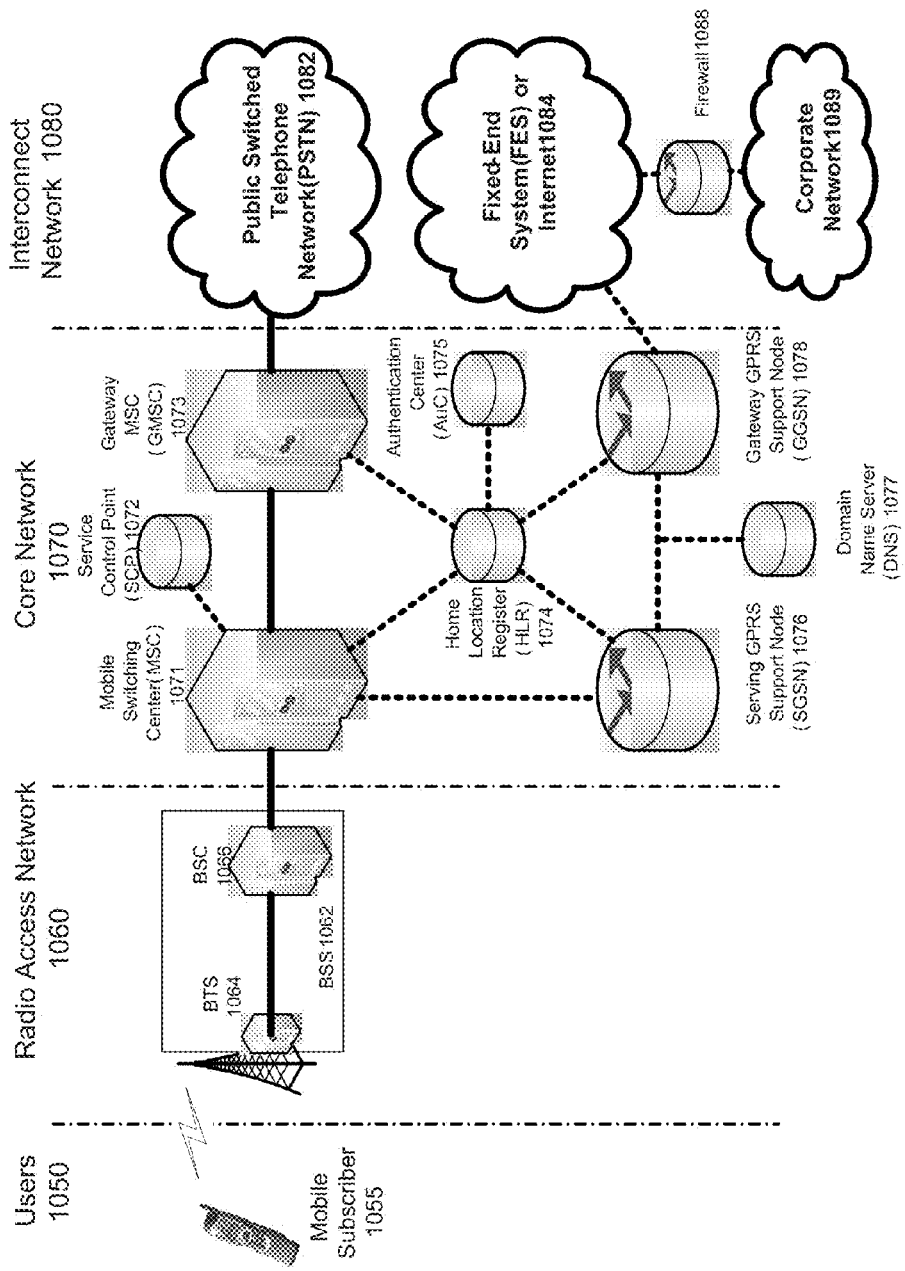
FIG. 6 illustrates a non-limiting exemplary architecture of a typical GPRS network, segmented into four groups, in which methods and systems for a centralized rescue network may be implemented.

FIG. 6 illustrates an architecture of a typical GPRS network segmented into four groups: users 1050, radio access network 1060, core network 1070, and interconnect network 1080. Users 1050 may comprise a plurality of end users (although only mobile subscriber 1055 is shown in FIG. 6). In an example embodiment, the device depicted as mobile subscriber 1055 may comprise any of mobile devices 150 and 160. Radio access network 1060 comprises a plurality of base station subsystems such as BSSs 1062, which may include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 6, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR/HSS 240 may be a device such as HLR 1074. HLR 1074 may store static information about the subscribers such as the International Mobile Subscriber Identity (IMSI), APN profiles, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 150 and 160, used by an end user of a mobile cellular service or a wireless provider. When a mobile subscriber turns on his or her mobile device, the mobile device may go through an attach process by which the mobile device attaches to an SGSN of the GPRS network. In FIG. 6, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076.

The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of centralized rescue network systems and methods such as those described herein may include, but are not limited to, any RAN component, Gateway GPRS Support Node tables, Fixed End System router tables, firewall systems, VPN tunnels, and any number of other network elements as required by the particular digital network.

Figure 7:
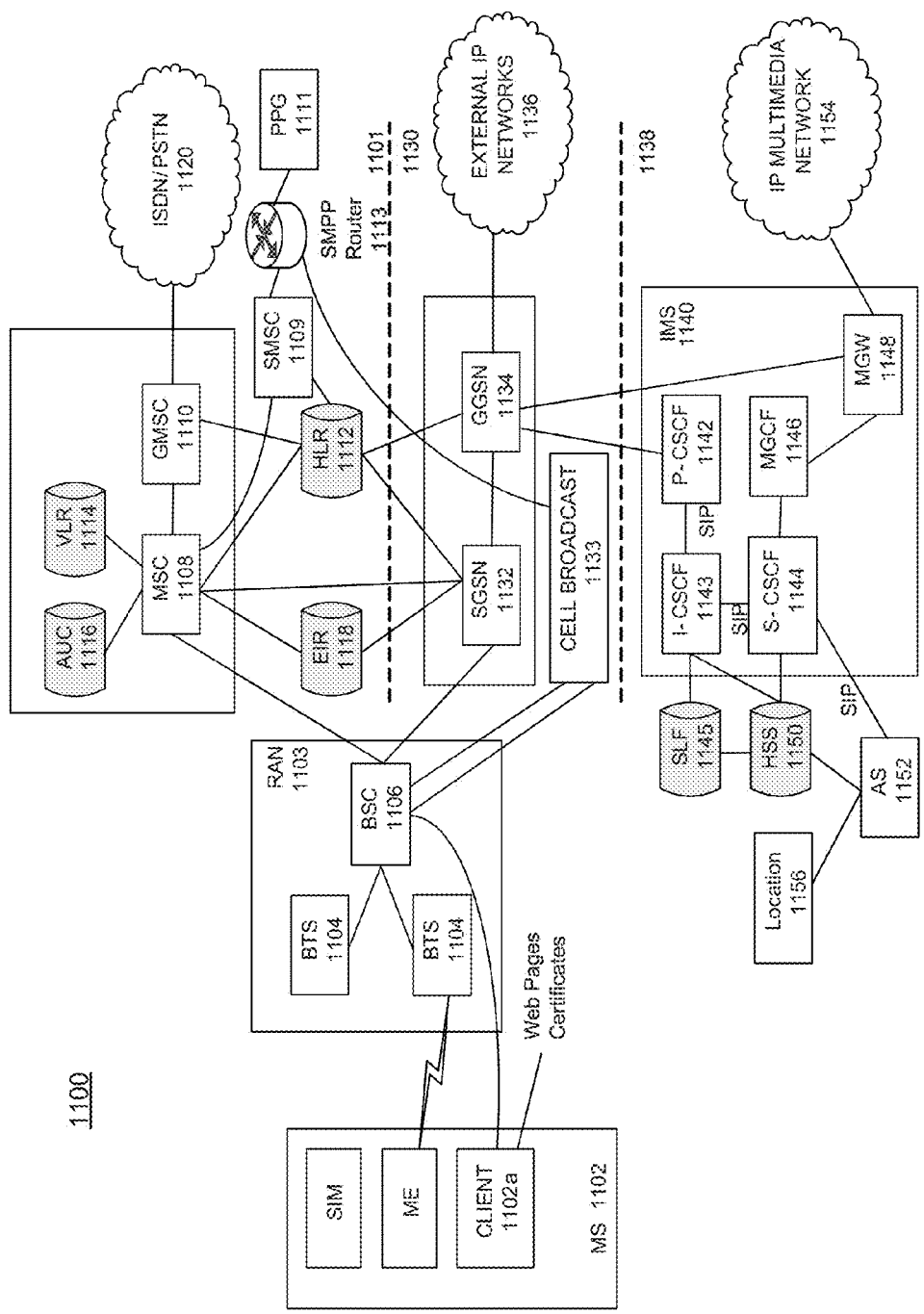
FIG. 7 illustrates a non-limiting alternate block diagram of an exemplary GSM/GPRS/IP multimedia network architecture in which methods and systems for a centralized rescue network may be implemented.

FIG. 7 illustrates another exemplary block diagram view of a GSM/GPRS/IP multimedia network architecture 1100 in which centralized rescue network systems and methods such as those described herein may be incorporated. As illustrated, architecture 1100 of FIG. 7 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 may be physical equipment or Mobile Equipment (ME), such as a mobile telephone or a laptop computer (e.g., mobile devices 150 and 160) that may be used by mobile subscribers, in one embodiment with a Subscriber identity Module (SIM). The SIM may include an International Mobile Subscriber Identity (IMSI), which may be a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 8:
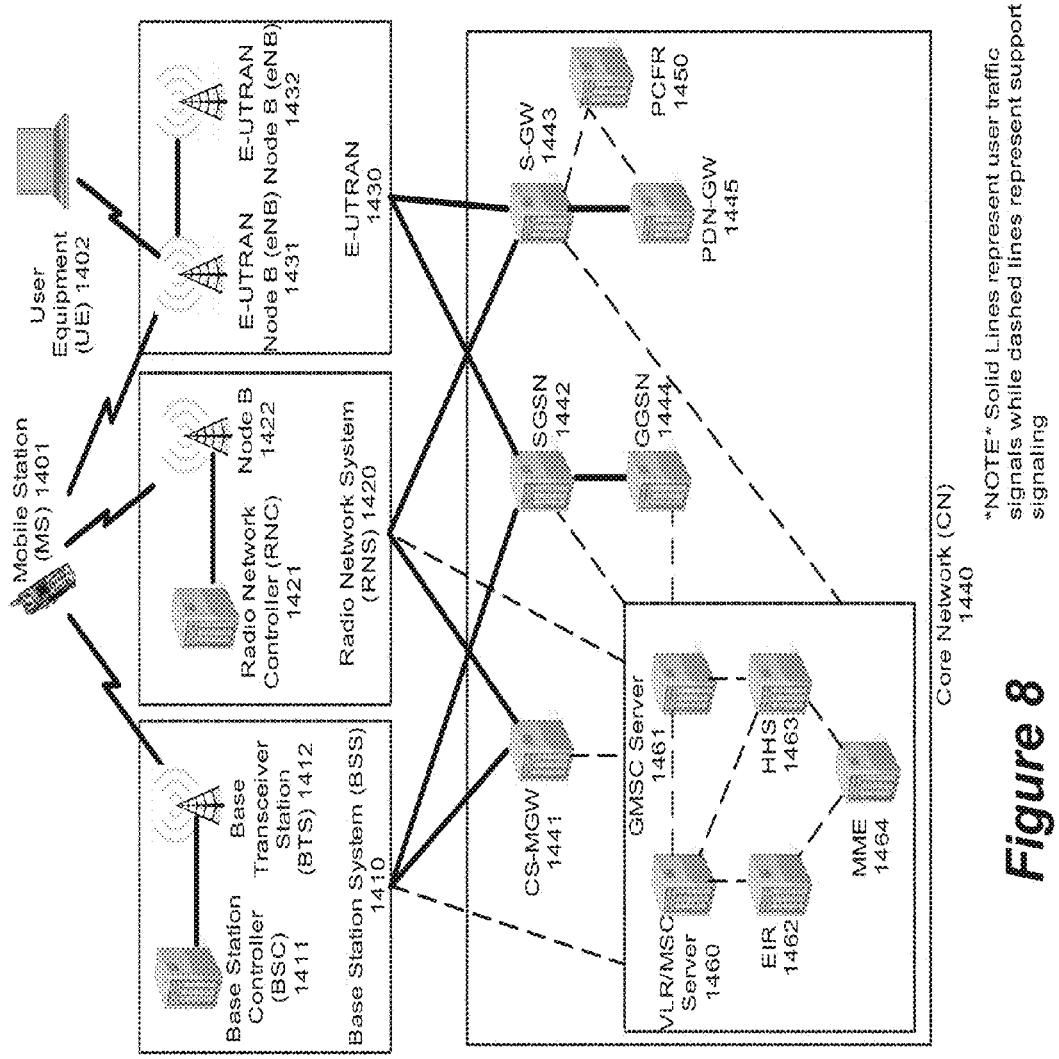
FIG. 8 illustrates a PLMN block diagram view of an example architecture in which methods and systems for a centralized rescue network may be incorporated.

FIG. 8 illustrates a PLMN block diagram view of an example architecture in which centralized rescue network systems and methods may be incorporated. Mobile Station (MS) 1401 is the physical equipment used by the PLMN subscriber. In one illustrative embodiment, any of mobile devices 150 and 160 may serve as Mobile Station 1401. Mobile Station 1401 may be one of, but not limited to, a cellular telephone, a cellular telephone in combination with another electronic device, or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 may be responsible for communicating with Mobile Station 1401 in its geographically defined area. RNC 1421 may be responsible for controlling the Node(s) B 1422 that are connected to it and is a control element in a UMTS radio access network. RNC 1421 may perform functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNode B, may also be referred to as an "eNB") 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In an illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 may include, but are not limited to, media conversion, bearer control, payload processing and other mobile network processing such as handover or anchoring. CS-MGW 1441 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 may include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information and may store subscription data regarding Mobile Station 1401 or User Equipment 1402 for handling calls or data sessions. Networks may contain one HSS 1463 or more if additional resources are required. Example data stored by HSS 1463 may include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of centralized rescue network systems and methods have been described in connection with various computing devices/processors, the underlying concepts may be applied to any computing device, processor, or system capable of implementing centralized rescue network systems and methods. The various techniques described herein may be implemented in connection with hardware or software or, where appropriate, with a combination of both. Thus, the centralized rescue network systems and methods may be implemented, or certain aspects or portions thereof, may take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is neither a transient nor a propagating signal per se. When the program code is loaded into and executed by a machine, such as a computer, the machine becomes an apparatus for implementing centralized rescue network systems and methods. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

While centralized rescue network systems and methods have been described in connection with the various embodiments of the various figures, it is to be understood that other similar embodiments may be used or modifications and additions may be made to the described embodiments for performing the same functions of centralized rescue network systems and methods without deviating therefrom. For example, one skilled in the art will recognize that centralized rescue network systems and methods as described in the present application may apply to any environment, whether wired or wireless, and may be applied to any number of such devices connected via a communications network and interacting across the network. Therefore, centralized rescue network systems and methods should not be limited to any single embodiment, but rather should be construed in breadth and scope in accordance with the appended claims.

What is claimed is:

1. A method comprising:
   receiving, at a centralized rescue network system, a first emergency alert communication from a first mobile device, the first emergency alert communication comprising an incident location;
   obtaining, at the centralized rescue network system, historical data representing emergency incidents that have occurred proximate to the incident location;
   determining, at the centralized rescue network system, a type of emergency response resource based on the historical data;
   determining, at the centralized rescue network system, a first emergency response services provider based on the type of emergency response resource;
   transmitting, from the centralized rescue network system, a first request for a first emergency response resource to the first emergency services provider, wherein the first emergency response resource is of a same type as the type of emergency response resource determined based on the historical data;
   receiving a second emergency alert communication from the first mobile device;
   determining a second emergency response services provider based on the first emergency alert communication, the second emergency alert communication, and the historical data; and
   transmitting a second request for a second emergency response resource to the second emergency services provider, wherein the second emergency response resource is of the same type as the type of emergency response resource determined based on the historical data.

2. The method of claim 1, wherein determining the first emergency response services provider is further based on determining that the first emergency response resource is available.

3. The method of claim 1, wherein determining the first emergency response services provider is further based on user data obtained by the centralized rescue network system.

4. The method of claim 1, further comprising transmitting a request for additional data to the first mobile device.

5. The method of claim 1, further comprising receiving a third emergency alert communication from a second mobile device, wherein determining the first emergency response services provider is further based on the third emergency alert communication.

6. The method of claim 5, further comprising transmitting a third request for a third emergency response resource to a third emergency services provider.

7. A centralized rescue network system comprising:
   a memory comprising executable instructions; and
   a processor, wherein the processor, when executing the executable instructions, effectuates operations comprising:
      receiving a first emergency alert communication from a first mobile device, the first emergency alert communication comprising an incident location;
      obtaining, historical data representing emergency incidents that have occurred proximate to the incident location;
      determining a type of emergency response resource based on the historical data;
      determining a first emergency response services provider based on the type of emergency response resource;
      transmitting a first request for a first emergency response resource to the first emergency services provider, wherein the first emergency response resource is of a same type as the type of emergency response resource determined based on the historical data;
      receiving a second emergency alert communication from the first mobile device;
      determining a second emergency response services provider based on the first emergency alert communication, the second emergency alert communication, and the historical data; and transmitting a second request for a second emergency response resource to the second emergency services provider, wherein the second emergency response resource is of the same type as the type of emergency response resource determined based on the historical data.

8. The centralized rescue network system of claim 7, wherein the operation of determining the first emergency response services provider is further based on determining that the first emergency response resource is available.

9. The centralized rescue network system of claim 7, wherein the operation of determining the first emergency response services provider is further based on user data obtained by the centralized rescue network system.

10. The centralized rescue network system of claim 7, wherein the operations further comprise transmitting a request for additional data to the first mobile device.

11. The centralized rescue network system of claim 7, wherein the operations further comprise receiving a third emergency alert communication from a second mobile device, wherein the operation of determining the first emergency response services provider is further based on the third emergency alert communication.

12. The centralized rescue network system of claim 11, wherein the operations further comprise transmitting a third request for a third emergency response resource to a third emergency services provider.

13. A non-transitory computer-readable storage medium comprising computer-executable instructions, which when executed by a processor, cause the processor to effectuate operations comprising:
receiving a first emergency alert communication from a first mobile device, the first emergency alert communication comprising an incident location;
obtaining historical data representing emergency incidents that have occurred proximate to the incident location;
determining a type of emergency response resource based on the historical data;
determining a first emergency response services provider based on the type of emergency response resource;
transmitting a first request for a first emergency response resource to the first emergency services provider, wherein the first emergency response resource is of a same type as the type of emergency response resource determined based on the historical data;
receiving a second emergency alert communication from the first mobile device;
determining a second emergency response services provider based on the first emergency alert communication, the second emergency alert communication, and the historical data; and
transmitting a second request for a second emergency response resource to the second emergency services provider, wherein the second emergency response resource is of the same type as the type of emergency response resource determined based on the historical data.

14. The non-transitory computer-readable storage medium of claim 13, wherein the operation of determining the first emergency response services provider is further based on determining that the first emergency response resource is available.

15. The non-transitory computer-readable storage medium of claim 13, wherein the operation of determining the first emergency response services provider is further based on user data.

16. The non-transitory computer-readable storage medium of claim 13, wherein the operations further comprise transmitting a request for additional data to the first mobile device.

17. The non-transitory computer-readable storage medium of claim 13, wherein the operations further comprise receiving a third emergency alert communication from a second mobile device, wherein the operation of determining the first emergency response services provider is further based on the third emergency alert communication.

18. The non-transitory computer-readable storage medium of claim 17, wherein the operations further comprise transmitting a third request for a third emergency response resource to a third emergency services provider.

* * * * *